United States Patent Office 3,227,558
Patented Jan. 4, 1966

3,227,558
PROCESS FOR AGGREGATING
COFFEE COMPOSITION
Raymond Richmond, 249—20 Thornhill Ave.,
Douglaston, Long Island, N.Y.
No Drawing. Filed Feb. 3, 1965, Ser. No. 430,188
3 Claims. (Cl. 99—71)

This application is a continuation-in-part of my copending application Serial No. 349,467, filed March 4, 1964, now abandoned, which is a continuation-in-part of my then co-pending application Serial No. 176,426, filed February 28, 1962, now abandoned, and which, in turn, was a continuation-in-part of my then co-pending application Serial No. 54,374, filed September 7, 1960, now abandoned.

Heretofore, there have been many forms of complete coffee preparations consisting of dry admixtures of coffee extract, powdered milk and/or sugar, or both. However, none of these prior art admixtures has ever been successful commercially. When dispensed into a cup of hot water, each had a tendency to disperse by showing an undersirable oiling, scumming, floating, curdling or other obnoxious surface conditions that indicates definitely a lack of homogeneity. Consequently, there was never provided an appetizing coffee beverage of uniform taste and aroma comparable to a full bodied cup of fresh coffee.

Cocoa-based compositions containing powdered coca and sugar, and optionally starch and/or dried milk, are also known for making chocolate puddings or cocoa beverages of simplified preparation. However, such compositions lack the characteristic of being substantially instantly soluble in water or milk, and tend to form a wet glob of material which requires physical dislodging and stirring to bring into solution. Generally undissolved material appears also on the surface of the water or milk. In addition, the chocolate pudding compositions fail to form a product of desirable firmness and uniform consistency, but instead sag and "weep" when cut vertically with a knife or spoon.

An object of this invention is to provide a process for making an instant coffee composition of instant coffee and sugar and/or powdered milk, or an instant cocoa composition comprising cocoa and sugar and/or powdered milk and/or starch.

Another object of the present invention is to provide a new process for making an integrated dry material of comprising instant coffee, powdered milk, sugar and/or combinations thereof, whose ingredients will not separate upon dispersion into water with the undesirable showings of oiling, scumming, floating, curdling or other obnoxious surface conditions that would tend to make the final beverage unappetizing to the eye.

A further object of the invention is to provide a new process for making an integrated material containing instant coffee, powdered milk, sugar and/or combinations thereof, wherein the composite particles of said material are in the form of discrete, fragile clusters which have a porous, sponge-like texture having a fraction of the bulk density of the original ingredients and in which there is no fractionation of the dry material due to varying densities under normal handling and shipping conditions. In these integrated cluster formations resulting from the process, which are also known as agglomerates, the coffee and milk portions become enveloped in a coating of sugar whereby oxidation cannot seriously affect the milk and coffee portions, thereby insuring indefinite keeping qualities and a longer shelf-life under normal atmospheric conditions.

An additional object of the invention is to provide cocoa compositions which dissolve substantially entirely and instantly in water or milk without leaving an undissolved residue floating on the surface or lying at the bottom of the liquid.

A still further object is to provide a chocolate pudding mixture from which an edible chocolate pudding may be made with whole milk, which pudding does not sag or "weep" when cut.

Briefly summarized, one embodiment of the invention is directed to making a dry integrated composition by substantially and thoroughly blending mixtures of either (A) instant coffee ingredients comprising instant coffee and sugar and/or powdered milk or (B) coca mixture ingredients comprising cocoa and sugar and/or dry powdered milk and/or starch, grinding the blended ingredients until the particles thereof have been reduced to an average particle size of less than approximately 40 microns, subjecting the ground ingredients to agglomeration by moistening, agitating and drying to form discrete, fragile, cluster agglomerates having a porous sponge-like texture and a bulk density less than a bulk density of the ground ingredients. Such agglomerates are characterized by being substantially entirely and instantly soluble in hot or cold water or milk.

In another embodiment, conventional dry instant coffee granules are intimately combined and processed with sugar, powdered milk and/or combinations thereof. When these ingredients have been substantially and thoroughly blended, the particles thereof are then finely ground and integrated through the process of agglomeration by moistening, agitation and drying to provide porous, sponge-like agglomerates, having a bulk density that is approximately one-half of the bulk density of the ground blended materials before agglomeration. Such agglomerates have a characteristic of dissolving instantly in water, preferably hot water, without any trace of separation of the individual ingredients. Consequently, only a light stirring, such as a person would ordinarily use in combining milk or cream in a cup of freshly brewed conventional black coffee, is required to produce a full bodied cup of eye satisfying coffee that has the taste appeal and aroma of fresh coffee.

In a further embodiment, the invention is directed to a soluble cocoa composition suitable for conversion into an edible food by dissolving in a potable aqueous liquid which comprises discrete fragile cluster agglomerates of previously substantially uniformly blended particles having an average size of less than about 40 microns of cocoa and sugar and/or powdered milk and/or starch. Such agglomerates have a fraction of a bulk density of the ground ingredients (before agglomeration) and are substantially entirely and instantly soluble in milk or water.

In still another embodiment of the invention, there is provided an instantly soluble cocoa composition suitable for conversion into an edible food by dissolving in a potable aqueous liquid which comprises a mixture of cocoa and sugar and/or powdered milk and/or starch made by substantially uniformly blending the aforesaid ingredients, grinding the blended ingredients to an average particle size of less than approximately 40 microns, and agglomerating the ground ingredients by moistening, agitating and drying such particles to form discrete, fragile cluster agglomerates having a fraction of the bulk density of the ground particles and characterized by being substantially, entirely and instantly soluble in water or milk.

In making the novel and unique integrated agglomerates of the present invention, the dry ingredients, i.e., instant coffee granules, or cocoa, and sugar, powdered milk, starch and/or appropriate combinations thereof, are combined and admixed in suitable proportions, as will hereinafter set forth. Thereupon, they are substantially and thoroughly blended in any conventional blending machine. "Substantially and thoroughly blended" or "substantially uniformly blended" mean the arranging of the particles of the mixture so that individual particles of each kind are distributed uniformly among all of the other particles. The optimum in blending is "perfect blending," wherein the individual particles of each kind are distributed with exact uniform spacing among all of the other particles, but this is somewhat difficult and expensive to obtain and determine under manufacturing conditions found in most commercial plants.

The "substantially and thoroughly blended" dry ingredients are now ready for grinding in a micro-grinding machine, preferably of the hammer-mill type, capable of grinding the ingredients to sufficient fineness. The temperature of the particles during grinding should be minimized, and preferably should not exceed about 140–150° F., in order to avoid undesirable drying or volatilization of essential oils in the coffee or cocoa. The dry ingredients should be very finely ground, and it has been found that the finer the grinding the more perfect the final product becomes. Micro-grinding is relatively expensive as compared to conventional grinding, and the finer the grind the more expensive the product becomes. Excellent results were obtained with grinds of one micron, but the cost of grinding was prohibitive for such inexpensive products as instant coffee and cocoa preparations. However, it was found that, when the average size of the ground particles was maintained at not more than approximately forty microns, advantageously with about 90% of the particles less than 45 to 50 microns, the formation of the agglomerates into discrete, fragile, clusters of a porous, sponge-like, texture having a fraction of the bulk density of the original ingredients, was excellent for making an instantly soluble complete cup of coffee upon the addition of water, preferably hot, without any tendency to disperse by showing any undesirable oiling, scumming, floating, curdling or other obnoxious surface conditions obvious to the eye. When the product was made by the present process with the ground particles having an average size in excess of 40 microns, there was a noticeable reduction in the solubility of the material. Some of the more sensitive tasters claimed to have noticed a loss in taste appeal of the instant coffee. It has not been possible to run exhaustive tests to determine the exact upper limits in the range of grinding. However, the need for grinding the dry ingredients has been demonstrated by the fact that when blended ingredients having an average size of between 90 and 100 microns were used in the process, the subsequently agglomerated product was unsatisfactory.

The dry blended powdery ingredients, having an average particle size of no larger than approximately 40 microns, are now ready for the step of agglomeration in which the individual small powdery particles are integrated and bonded together into discrete, fragile clusters. Such clusters are commonly known as agglomerates. Each agglomerate is discrete and has a porous, sponge-like texture and a bulk density of approximately one-half of the bulk density of the "substantially and thoroughly blended" particles before agglomeration.

One process and apparatus for agglomerating the blended ingredients by moistening, agitation and drying is described in United States Patent No. 2,893,871, granted July 7, 1959. In this process the blended particles are fed in a very thin and fine stream between agglomerating jets of an inert gaseous vapor, such as steam, which slightly surface moistens the individual particles. The surface moistened particles, now being moderately adhesive, are passed through a mildly heated turbulent air stream, having a temperature approximating 240° F. which causes the integration and agglomeration with the formation of discrete and minute clusters of a porous, sponge-like texture having a fraction of bulk density of the original ingredients, and a low moisture content of about 1½ to 3%.

Another satisfactory process and apparatus for agglomerating the blended particles by moistening, agitation and drying is described in United States Patent No. 2,995,773. In this process and with the apparatus described therein, the blended particles are moved by vibration in the form of a moving fluidized bed. During the first part of the movement, the particles are subjected to super-heated vapor, usually steam and usually mixed with a substantially non-condensable carrying gas, directed transversely of the travel of said bed. The temperature of the super-heated vapor is originally above the dew point to thereby heat the moving particle, and, in so doing, reduce the vapor temperature to its dew point and subsequently thereto to deposit vapor condensation upon the surfaces of the moving particles. Thereafter, a drying fluid is injected to permeate the bed of moving particles, thereby drying the adhesive substances previously formed and rigidifying the agglomerates produced through contacting and colliding particles.

It will be obvious that the step of agglomeration need not be limited to these two processes but any other process capable of forming through moisture, agitation and drying agglomerates of a porous, sponge-like texture having a fraction of the bulk density of the original ingredients will be satisfactory.

In the agglomerating process, it will be noted that the heating of the particles is held to a minimum because the drying action is substantially instantaneous. No after drying at high temperatures is necessary. In such a process the moisture pick-up is controlled within narrow limits.

The accurate control of the time and temperature and moisture content serves to protect the original characteristics of the ingredients by inhibiting denaturation and volatilization of heat-sensitive additives, thereby maintaining a closer identification of the original characteristics than otherwise obtainable, and to prevent caking of the particles. Such treatment not only decreases the bulk density of the final composition to approximately one-half of the bulk density of the starting blended powdery preparation, but also renders the resultant fragile cluster formulations or particles discrete, porous and sponge-like in texture, which greatly facilitates wetting and solubility in water or milk.

The resultant integrated agglomerated material has to the naked eye the original characteristics of a very finely blended powder that is free-flowing. However, when dropped into hot water, the individual clusters or particles do not tend to float but disappear instantly; when dropped into cold water, the clusters disappear quickly upon light stirring of the beverage. The integrated agglomerated material has superior dissolution characteristics because the penetrating moisture breaks up the agglomerated clusters, allowing each individual cluster to disperse and dissolve. Obviously, there are no hard particles which could or would have a tendency to dissolve slowly or settle out, thereby weakening the taste, aroma and/or appearance of the finished beverage.

In preparing the necessary ingredients for the making of satisfactory agglomerates of instant coffee, the following ratios or percentages suggest practical limitations for the making of a good cup of instant integrated coffee, having appetizing eye appeal, taste and aroma, wherein all ratios or percentages have been calculated by weight:

In an agglomerate containing sugar, coffee and milk powder:

|  | Percent |
|---|---|
| Dry instant coffee | 15 to 25 |
| Dry powdered milk | 10 to 40 |
| Dry sugar | 40 to 80 |

In an agglomerate containing only coffee and sugar:

| | Percent |
|---|---|
| Dry instant coffee | 20 to 35 |
| Dry sugar | 65 to 80 |

In an agglomerate containing only coffee and milk powder:

| | Percent |
|---|---|
| Dry instant coffee | 30 to 38 |
| Dry powdered milk | 62 to 70 |

It has been found that the body of the finished drink can be improved by incorporating a stabilizing substance or agent into the dry ingredients at the time of blending. Many conventional stabilizers have been found quite satisfactory such as, for example, carboxymethylcellulose, which is also known as "CMC," alginates, gum arabic, gum guar, etc. When such a stabilizer is to be used, it should be blended with the dry ingredients in the ratio by weight of approximately 0.2% of the unit being processed. However, the amount of stabilizer may be varied either way according to the body of the beverage desired.

It has also been discovered in carrying out the above agglomeration with the ingredients of the present invention that the sugar, which provides the bulk of the mass of each agglomerate as compared to the other ingredients, has a tendency to envelope or coat the surface of each agglomerate. Such a coating quite obvious provides an effective seal against oxidation. At least, if it does not effectively prevent oxidation, it greatly slows down the process. Thus, the material of this invention has substantially indefinite keeping qualities and a greatly increased shelf-like at normal atmospheric temperatures, especially since the fat particles in the milk are coated and sealed against oxidation, which is the principal cause of rancidity.

Instant coffee preparations prepared as described herein have been stored in capped jars for four years under refrigeration and at warm (80-85° F.) room temperature. The stored samples have been sampled, by making instant coffee from them, at about six-month intervals during storage, and no loss of desirable characteristics has been detected, despite the fact that at no time during storage were the samples packed under vacuum or positive pressure.

While it is difficult to define the particular amount of the integrated material to be used with one cup of water, because coffee drinkers have different ideas and tastes as to strength, it is believed two to four teaspoons of the material to each cup of hot water will provide for most drinkers a satisfactory hot cup of coffee having a taste appeal, eye appeal and the aroma of a full bodied cup of freshly brewed coffee. However, if a stronger coffee is desired, the amount of the material must be proportionately increased, and, if a weaker coffee is desired, the amount of the material may be proportionately decreased. While the amount of material required to make one complete cup of full bodied coffee may seem excessive as compared to the conventional instant coffee, it must be realized that the milk and sugar have been integrally blended with the coffee particles in each agglomerate.

Turning now to cocoa-based compositions, they typically vary widely in composition but the variation is not critical. Pre-mixed chocolate puddings contain cocoa, starch, and sugar and optionally a small percentage of fats and monoglycerides. Cocoa-based compositions adapted to be made into beverages by dissolving in milk contain cocoa and sugar as the primary ingredients and, if to be made using water, may also contain dry powdered milk. In these compositions, the cocoa ranges from about 10% to about 40%, the sugar from about 25% to 80%, powdered milk, if present, from about 10% to about 75%, and starch, if present, from about 5% to about 40%. The cocoa and sugar usually comprise at least 50 weight percent of the total composition.

An instant chocolate pudding composition was made by uniformly blending about 15% cocoa, about 25% starch, a small (½-3%) amount of fat and monoglycerides and about 55% sugar. The blend was ground in a hammermill (a No. 5 Micro-Atomizer manufactured by the Pulverizing Machine Company.) The feed temperature was 70° F. and the ground product temperature was about 96-100° F. The ground product had an average particle size of less than 40 microns, with 92.5% of the product having a size of less than 45 microns. Its bulk density was 31 pounds per cubic foot and its moisture content was 1.5 weight percent.

The ground material was agglomerated by moistening, agitating and drying using equipment of the general character described in U.S. Patent No. 2,893,871. The agglomerated product had a bulk density of 20.55 pounds per cubic foot and a moisture content of 2.8%. One half gram of agglomerated product when added to 100 milliliters of cold milk substantially entirely dissolved in 1-2 seconds, except for a trace of material remaining on the surface of the milk, which was quickly dispersed with light stirring. The product agglomerates had the following screen analysis:

| | Percent |
|---|---|
| On 30 mesh | 9.5 |
| On 40 mesh | 9.5 |
| On 60 mesh | 13.3 |
| On 80 mesh | 17.1 |
| On 100 mesh | 12.3 |
| On 120 mesh | 9.5 |
| On 200 mesh | 15.2 |
| Thru 200 mesh | 13.3 |

A chocolate pie made by dissolving 4¼ ounces of the agglomerates in two cups (of 8 ounces) of refrigerated milk jelled in a few minutes to a consistency sufficient to permit it to retain its shape without sagging and without any "weeping" or "bleeding" of fluid upon sections being cut from it. Only light stirring by hand a few seconds was used to achieve full dissolution of such agglomerates in the milk. In contrast, a chocolate pie made from a mixture of the same blend of ingredients, but which had not been ground to an average particle size of less than 40 microns and then agglomerated, did not jell as rapidly and did sag and "weep" when a section was cut from it. Vigorous stirring with an electric beater was used in order to get such mixture to dissolve in the milk.

The terms "instant coffee" or "instant coffee granules" as used in the specification and claims are intended to include any of the conventional instant coffee praparations now on the market, and is intended to also include coffee preparations from which the caffein has been removed and which are frequently referred to as "decaffinated coffees."

The term "cocoa" as used throughout the specification and claims includes any normally solid cocoa of varying fat content (from nearly zero to about 50%) obtained by pressing cacao beans (called "nibs"), including cocoa which has been alkali-treated by the so-called Dutch process.

The term "powdered milk" as used throughout the specification and claims is intended to include not only conventional powdered whole milk, powdered skim milk, but also conventional milk substitutes or milk compounds containing, as for example, skim milk, corn syrup solids, lactose, hydrogenated oil, sodium caseinate, dipotassium phosphate, emulsifies and flavor.

The term "sugar" as used in the specification and claims is intended to include not only the conventional granulated and/or powdered sugars, but also all other forms of sugar, including the so-called "fortified sugars" wherein saccharine, sodium cyclamate and other sweetening substances are combined with conventional sugars to reduce the weight and bulk of the final product while at the same time increasing the sweetness thereof.

The term "starch" as used throughout the specification and claims includes edible vegetable starches obtained from cereal grains, such as corn, wheat, or rice, or from roots and tubers, such as tapioca or potatoes.

The term "stabilizer" as used in the specification and claims is intended to cover any conventional stabilizing substance that is capable of increasing the body of the drink, including carboxymethylcellulose, alginates, gum arabic, gum guar, etc.

The term "potable aqueous liquid" as used throughout the specification and claims includes water, whole milk, reconstituted milk, and synthetic milk, alcoholic beverages (such as are used in making nogs or punches), and mixtures thereof, of a purity fit for human consumption.

Although several embodiments of the invention have been described in detail herein, it will be evident to those skilled in the art that various other modifications may be made therein without departing from the principles of the invention.

Having thus described the invention, I claim:

1. The method of making a dry integrated beverage material which comprises the steps of substantially and thoroughly blending instant coffee, sugar and powdered milk, grinding the dry blended ingredients until the blended preparation has been reduced to no larger than an average particle size of approximately 40 microns, and subjecting the ground ingredients to agglomeration by moistening, agitation and drying to form discrete, fragile, cluster agglomerates of a porous, sponge-like, texture having a fraction of the bulk density of the original ingredients.

2. The method of making a dry integrated beverage material which comprises the steps of substantially and thoroughly blending instant coffee and sugar, grinding the dry blended ingredients until the blended preparation has been reduced to no larger than an average size of approximately 40 microns, and subjecting the ground ingredients to agglomeration by moistening, agitation and drying to form discrete, fragile, cluster agglomerates of a porous, sponge-like, texture having a fraction of the bulk density of the original ingredients.

3. The method of making a dry integrated beverage material which comprises the steps of substantially and thoroughly blending instant coffee and powdered milk, grinding the blended ingredients until the dry blended preparation has been reduced to no larger than an average size of approximately 40 microns, and subjecting the ground ingredients to agglomeration by moistening, agitation and drying to form discrete, fragile, cluster agglomerates of a porous, sponge-like, texture having a fraction of the bulk density of the original ingredients.

References Cited by the Examiner

UNITED STATES PATENTS

| 2,995,773 | 8/1961 | Gidlow et al. | |
| 3,006,763 | 10/1961 | Marcy et al. | 99—26 |
| 3,011,897 | 12/1961 | Grosvenor | 99—141 |
| 3,013,881 | 12/1961 | Carlson et al. | 99—24 |
| 3,042,526 | 7/1962 | Spiess et al. | 99—56 |
| 3,143,428 | 8/1964 | Reimers et al. | 99—141 |

FOREIGN PATENTS 562,711    9/1958    Canada.

A. LOUIS MONACELL, *Primary Examiner.*

M. W. GREENSTEIN, *Assistant Examiner.*